Feb. 4, 1947. C. KAUFMANN ET AL 2,415,355
DENSIFYING FINELY DIVIDED MATERIALS
Filed July 30, 1943 3 Sheets-Sheet 2

INVENTORS
CHARLES KAUFMANN &
ARTHUR HOIJORD ANDERSEN
BY Alan Smabey
ATTORNEY

Feb. 4, 1947.  C. KAUFMANN ET AL  2,415,355
DENSIFYING FINELY DIVIDED MATERIALS
Filed July 30, 1943   3 Sheets-Sheet 3

INVENTORS
CHARLES KAUFMANN &
ARTHUR HOJORD ANDERSEN
By
Alan Hurabey
ATTORNEY

Patented Feb. 4, 1947

2,415,355

UNITED STATES PATENT OFFICE 2,415,355

DENSIFYING FINELY DIVIDED MATERIALS

Charles Kaufmann and Arthur Hoijord Andersen, Shawinigan Falls, Quebec, Canada, assignors to Shawinigan Chemicals Limited, Montreal, Quebec, Canada, a corporation of the Dominion of Canada Application July 30, 1943, Serial No. 496,830
In Canada June 4, 1943

5 Claims. (Cl. 100—35)

Introduction

This invention relates to expedients for increasing the specific gravity of masses of finely divided materials of a dry pulverulent or flocculent nature, which must be handled with care in order to avoid their destruction or deterioration.

While in its broader aspects, the invention is applicable to various types of material, its nature will be clearly understood by reference to its application in the treatment of carbon black which is particularly difficult to handle.

It will be understood that certain types of carbon black are difficult and uneconomical to transport in the form in which they are produced, hence the necessity for its densification. At the same time, since the useful properties of the material depend largely on the aggregates retaining their natural form, any reduction in the bulk of the material must be accomplished without damaging these aggregates to an undesirable extent. Therefore, methods of densification such as screw compressing, ball milling and rod milling have been impractical as they alter the structure of the black to an undesirable extent. One method which is more or less suitable embodies the use of a plunger. While this does not alter the structure of the black as much as the other processes, the capacity of plunger presses is not sufficiently great for commercial operations.

These remarks apply in greater or lesser degree to other materials which for one reason or another must be densified and in treatment must be handled in such a way that their structure is not broken down or, in the case of explosive materials, so that frictional contact between the particles is reduced to a degree at which the chance of explosion is minimized.

Objects

Having regard to the foregoing, it is a principal object of the present invention to provide a commercially applicable process for densifying masses of materials of dry pulverulent nature while retaining the naturally occurring structure of their particles and agglomerates. A further object of the invention is to provide a method of this nature in which the production rate is high. A further object is to provide a method of this nature in which the material may be densified to a predetermined extent. A more specific object is to provide a process of this nature, in which carbon black, particularly the more delicate types, may be densified without undesirably altering the naturally occurring physical structure of its particles or agglomerates. A still further object is to provide convenient equipment for carrying out such a process.

The invention

These objects and others are accomplished according to the invention by advancing a layer of the material to be compressed while subjecting successive portions of it to gradually increasing pressure. This may be accomplished conveniently by feeding the layer of the material between moving surfaces, which converge thus exerting predetermined increasing and preferably yielding pressure on the advancing layer, and at the same time confining the material from lateral movement. The surfaces are porous and thus allow the escape therethrough of gas from the material being treated. In this manner, air is expressed from the layer of material, the material itself being subjected to a minimum of agitation or relative movement between the particles. Predetermined pressure can be exerted on the material, such that the latter is compressed to the desired degree without injury to its mechanical structure.

Detailed description

Each material treated will require specific conditions such as feeding speed, pressures, etc. and other factors as will become evident from the detailed description to follow:

In the treatment of carbon black of extremely low density, it has been found desirable to densify it in more than one stage. The first pressing operation is mainly to express air or gases from the very light masses in the form in which they occur. A subsequent pressing operation has the effect of re-orienting the particles and aggregates to a position in which they occupy less space. Hence, it is preferable to pass the material between successive presses.

One preferred form of press particularly suitable for carrying out pressing operations according to the invention embodies a pair of continuous belts converging from the feeding point of the material to a final pressure nip adjacent the discharge point and means cooperating with the belt adapted to feed the material between them continuously, whereby the forward movement of the belts, their convergence and the pressure imposed between them causes compression of the layer so formed. The path of the belts is defined by underlying perforated supports which bear against them to prevent their sagging under pressure. Confining aprons cooperate with the belts to prevent lateral expansion of the material. The belts and aprons are of porous material, preferably a suitable textile, and the supports perforated so as to permit escape of air therethrough from the material as the layer is compressed. Where handling commercial quantities of material, a special arrangement is desirable for feeding the material to the mouth of the machine.

According to one preferred arrangement, a funnel-shaped hopper is employed, in which there is operative on the material first a porous screw and then an agitating device and finally a solid screw. These instrumentalities prevent the material from becoming packed while it is being forced ahead towards the compressing device while at the same time are designed to prevent injury to the structure of the black. Means is also provided to govern the initial thickness of the layer to be pressed.

The drawings

In order to explain the invention more specifically, reference will be made to the accompanying drawings showing a specific form of apparatus used for carrying out a preferred embodiment of the process. Specifically, this apparatus is designed for the treatment of carbon black particularly that of the type resulting from the thermal decomposition of acetylene, but it is wished that this specific description be taken merely as illustrative of the process and apparatus of this invention to materials of this and other types to which it has application.

In the drawings:

Figure 2 is a plan view of the press proper forming part of the apparatus shown in Figure 1.

Figure 3 is a cross section through the press portion of the apparatus shown in Figures 1 and 2.

Figure 1:
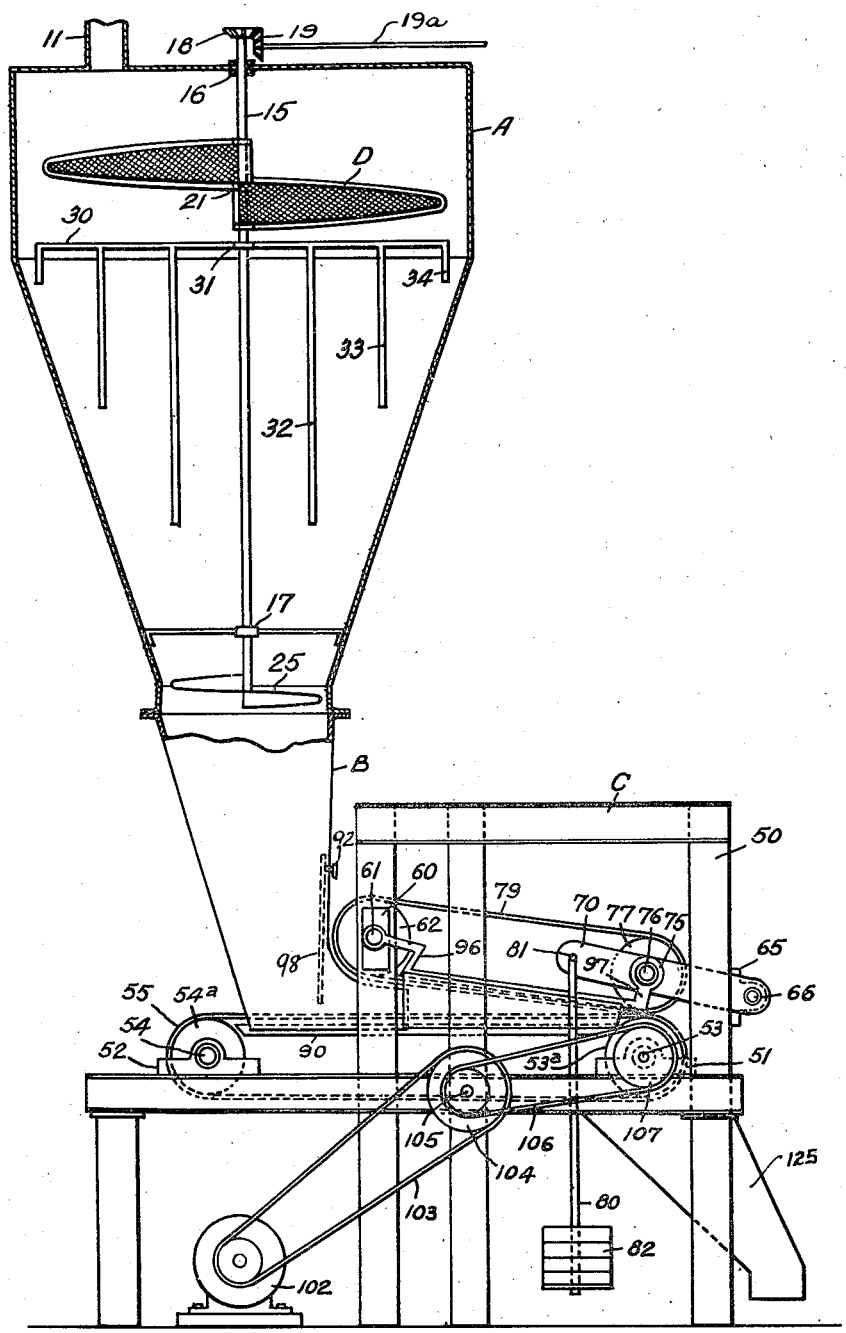
Figure 1 is a general arrangement being a side elevation partly in section showing an apparatus suitable for carrying out a pressing operation according to the invention.
Figure 4:
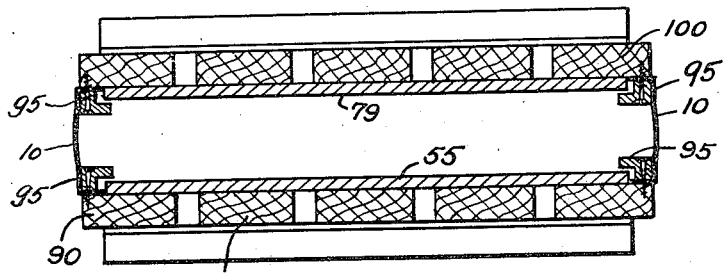
Figure 4 is an enlarged partial cross section substantially along the line 4—4 of Figure 3.
Figure 5:
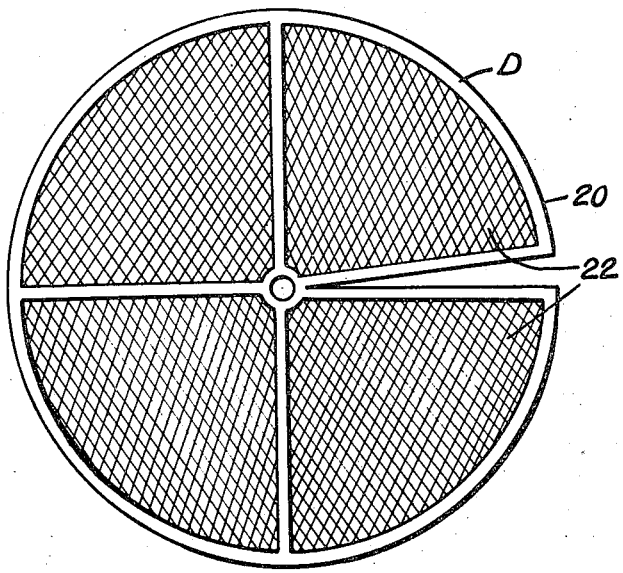
Figure 5 is a top plan view of the perforated screw device shown in Figure 1.

More particular reference will now be made to the apparatus shown in Figures 1 to 5 of the drawings especially in conjunction with a two-stage process for densifying carbon black. A is a funnel-shaped tank in which the black substantially in the form in which it originally occurs is received from storage and through which it is fed towards the hopper B and the compressing device C.

The tank A includes an entrance pipe 11 leading from the storage bin. Within the tank is a centrally arranged vertical drive shaft 15 journalled in bearings 16 and 17 connected to the tank A. On the top end of the shaft 15 is a bevel gear 18 meshing with a bevel gear 19 on a horizontal drive shaft 19a receiving its drive from a convenient source of power (not shown). On the shaft 15 slightly below the top of the tank, is mounted an upper extruding screw D made up of a framework 20 connected to a collar 21 mounted on the shaft 15. The frame divides the screw into segments each of which is provided with a screen 22. Just beneath the screw D is an agitating device including a horizontally extending arm 30 mounted on a collar 31 fixed to the shaft 15. Extending downwardly from the arm 30 at each side of the drive shaft 15 are arms 32, 33 and 34 of graduated length. On the lower end of the shaft 15 is mounted a short spiral extruding screw 25. This mechanism as will be described is adapted to feed the black from the tank into the hopper B and thence to the press. The hopper B is of decreasing cross section and substantially L-shaped form as indicated, having a discharge opening adjacent the mouth of the press device.

The press C is mounted on a frame 50. Carried on horizontal beams, one at each side of the frame, are bearings 51 and 52 in which are journalled horizontal shafts 53 and 54 respectively, carrying rollers 53a and 54a extending the width of the frame. On these rollers, and adapted for travel thereabout, is mounted an endless belt 55. On centrally arranged vertical beams spaced from the feed end of the press, one at each side of the frame, are mounted fixed bearing blocks 60 in bearings in which is journalled a horizontal shaft 61 carrying a roller 62. On two other vertical beams at the discharge end of the press, are mounted bearing blocks 65 including bearings, in which is journalled a shaft 66 extending the width of the machine. On a bearing at each end of this shaft is journalled the end of a lever 70 extending inwardly of the frame. Suspended from the inner end of each lever 70 is a weighting device including a downwardly extending rod 80 pivotally mounted as at 81 to the end of the lever. On the lower end of each rod 80 is a weight 82, capable of being adjusted to impose different predetermined weights on the end of the lever. Intermediate its ends, each lever 70 carries a bearing 75, in which is journalled a shaft 76 extending laterally the width of the frame and carrying a roller 77. An endless belt 79 travels about the rollers 62 and 77. The belts 55 and 79 are of porous textile material.

Beneath the top run of the belt 55 and fixedly mounted on the frame B is a platform 90 made up of several laterally spaced-apart longitudinally extending slats 91. This platform is suitably attached by brackets to the frame 50. The edges of the platform 90 are provided with substantially L-shaped confining members 95, a flange of which overlaps the edges of the belt 55 and retains them close to the platform. A similar platform 100 is mounted on brackets 96 and 97 journalled on the ends of the shafts 61 and 76 respectively. In this way, the platform 100 is held adjacent the belt for pivotal movement therewith about the shaft 61. Elements 95 similar to those attached to the platform 90 are secured to the edges of the platform 100 for the purpose of retaining the edges of the belt 79 close to the platform. Aprons 10 extend between the platforms 90 and 100 and are connected thereto to prevent lateral escape of the black. The belts and aprons are of porous i. e. foraminous textile material so as to permit the escape of air therethrough. A gate 98 sliding in a guideway 99 in the hopper B and operated by a handle 92 is provided for governing the thickness of the layer of material fed on to the lower belt 55.

The apparatus is driven from a suitable source of power, as for instance, an electric motor 102, through a belt 103, running about a pulley 104, which is journalled on a shaft 105 extending the width of the machine. From the pulley 104 there extends a belt 106, which drives a pulley 107 mounted on the shaft 53, thus driving the roller 53a.

Operation

In operation of this press, the material is fed from storage, through the pipe 11, into the top of the tank A. The feeding and the agitating device is rotated by the shaft 15, the screw action of the screen D forcing the material down the tank, the agitating bars 32, 33, 34 at the same time keeping it from packing, i. e. in a substantially loose condition. The screw 25 feeds the material from the tank into the hopper B under pressure and past the gate 98 on to the belt 55 by which it is carried to the mouth of the compressing passage formed between the belts 79 and 55.

These belts are operated in synchronism so that their adjacent sections both move at substantially the same speed, from left to right (as viewed in the drawings). The material is carried by the action of the lower belt 55 between the belts 79 and 55, and becomes gradually engaged in the reducing throat between these belts, where it is compressed relatively slowly in a direction transverse to its flow, to an extent depending on the convergence of the belts and on the pressure exerted by the weighting of the lever 70. Lateral escape of the material itself is prevented by the porous aprons 10, but the air forced from the material escapes through these aprons and through the porous belts and supports holding these belts in position. The black is carried on until it passes between the narrowest portion or throat formed by the belts 79 and 55 between the nip of the rollers 77 and 53a where it is subjected to a predetermined yielding pressure. The pressed material, where carbon black is being treated, expands to some extent as it leaves the press. From between the nip of the rollers 77 and 53a the black drops down the chute 125.

The material thus treated is densified to an extent determined by the weight imposed between the rollers 77 and 53a. It may be desirable to densify this material further by a somewhat higher pressure, as for instance, in the treatment of carbon black. This is preferably done in another apparatus operating substantially according to the same principle.

It is important to note that the pressure at which the material is subjected is not a fixed but a yielding pressure. This compensates for irregularities in the resistance of the material and prevents undue pressure being exerted upon it which might cause a distintegrating action on the particles and agglomerates. The gradual convergence of the belts provides for a gradual increase in pressure, thus avoiding undue friction between the particles and agglomerates of the material being treated. As will be understood, this is of extreme importance where delicate materials such as carbon black and explosives are being handled.

Acetylene black

In the treatment of the flocculent carbon black produced by the thermal decomposition of acetylene, a preferred procedure is as follows. The starting material comes from the retort as a finely divided material having a density of between about 1 and about 1½ lbs. per cubic foot. It is passed through an apparatus similar to that described and according to the conditions specified so that the product at the discharge end has a density of about 6¼ lbs. per cubic foot. This product is then subjected to a second pressing operation in substantially the same type of apparatus, but under conditions such that the product coming from the second pressing operation has a density of about 12½ lbs. per cubic foot. The degree of compression is arbitrary, agreeing with standard densities at which carbon black is supplied to the trade.

Particles of this product have a substantially lace-like structure when viewed under the electron-microscope. The number of fibers and threads aggregated together give the black its fluffy flocculent characteristic and low density. This structure remains substantially the same as the black coming from the retort with the exception that the air or gas has been expressed therefrom and the particles have been reoriented to occupy less space. The alteration in the structure of the black and consequently the alteration of its absorptive and other capacities dependent on this structure is, by this method of compression, reduced substantially to a minimum for the particular degree to which the material is densified.

Examples

In order further to illustrate the method of treating, according to the invention, carbon black of the type produced by the thermal decomposition of acetylene or equivalent material specific details of the process factors involved in densifying commercial quantities of black will now be given by way of example. The figures given should not be taken in a limiting sense.

Two presses were employed substantially of the general characteristics above described. The first press had approximately the following dimensions:

*Characteristics of process and apparatus*

| | | |
|---|---|---|
| Width of belts | inches | 24 |
| Active width (black layer) | do | 12 |
| Thickness of belt | do | ¼ |
| Diameter of rolls | do | 12 |
| Length of belt from center of feed roll to center of compression roll: | | |
|   Upper belt | feet | 5 |
|   Lower belt | do | 8½ |
| Speed of belts | ft. per minute | 20 |
| Average height of black layer: | | |
|   Feed end | inches | 5 |
|   Outlet | do | *½ |
| Angle of convergence of belts | degrees | About 3 |
| Weight of compression | pounds | 3600 |
| Density of material: | | |
|   Before compression | | |
|     pounds per cubic foot | | 1 |
|   After compression | do | 6¼ |

* The black expands again to some extent after passing through the front rolls.

1200 pounds of black produced by the thermal decomposition of acetylene were delivered from the decomposition retort at a density of between about 1 and about 1½ pounds per cubic foot and were passed through this apparatus according to the above conditions in about 1 hour. The material collected at the discharge end of the apparatus was of uniform density of about 6¼ pounds per cubic foot.

This material then was subjected to pressing in a second apparatus of substantially the same type as described above, substantially according to the following dimensions and operating characteristics.

| | |
|---|---|
| Width of belts | 20 inches |
| Active width (black layer) | 20 inches |
| Thickness of belt | ¼ inch |
| Diameter of rolls | 12 inches |
| Length of belt from center of feed roll to center of compression roll: | |
| Upper belt | 27 inches |
| Lower belt | 53½ inches |
| Speed of belts | 18¼ ft. per minute |
| Average height of black layer: | |
| Feed end | 1 inch |
| Outlet | ¼ inch but expands to ½ inch |
| Angle of nip | About 5° |
| Weight on top compression roller | 28,000 pounds |
| Gate opening | 1 inch |
| Compression of material: | |
| Before | 6¼ lbs./cu. ft. |
| After | 12½ lbs./cu. ft. |

Operating under these conditions on the black discharged from the first apparatus as noted above, the material resulting was a uniform black having an apparent density of about 12½ pounds per cubic foot.

The process as described above is broadly applicable to delicate materials of a substantially dry flocculent or pulverulent nature containing entrained air or gas and which require careful handling, in order that the mechanical structure of the particules shall not be materially altered. These materials include lamp black, carbon black and other powders and explosive materials such as for instance, trinitrotoluene (TNT) and amatol (a mixture of TNT and ammonium nitrate). In the case of the latter materials it is important that they be compressed without friction which causes detonation. The nature of the present method is such that the powdery materials may be handled in bulk and treated continuously at a high rate.

*Advantages*

The great advantage of this process and apparatus is, therefore, that bulk powdery or flocculent materials especially those having a characteristic structure which it is desired to preserve or explosives sensitive to friction can be compressed rapidly without damage. At the same time, the method and apparatus is applicable to high production rate and can, therefore, be used commercially. The operation may be carried on continuously. The features of the apparatus are relatively simple. It is easy to construct. The degree of compression can be adjusted so that the compressed product has the desired density.

It will be understood that the above embodiments are preferred and given for the purpose of illustration. Therefore, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

We claim:

1. A device for densifying dry powdery materials, comprising in combination, first and second rollers having parallel axes and mounted in a substantially horizontal plane, a first belt of foraminous textile material adapted to travel about said rollers, third and fourth rollers having parallel axes and mounted in a plane converging with said horizontal plane, said third roller being adjacent to and above said first roller to form therewith a throat, a second porous belt adapted to travel about said third and fourth rollers to converge with said first belt, said third roller being mounted for up and down movement, means for exerting a yielding pressure on said third roller thereby to exert pressure at said throat, a support adapted to bear against the top run of said first belt for causing it to maintain a straight path, a support adapted to bear against the lower run of said second belt for causing it to maintain a straight path, said supports having openings therein adapted to pass gas therethrough, said supports projecting beyond the sides of said belts, flexible porous walls between the edges of the respective supports adapted to confine the material from lateral movement, and means for feeding a layer of said material forcibly between said belts.

2. A device for densifying dry powdery materials, comprising in combination, a substantially horizontal porous carrier adapted to receive the material and to convey it in a relatively thin layer to points at which it is gradually compressed by a converging porous belt, porous side walls close to said carrier and said belt for confining the material therebetween, a tapering feeding hopper adjacent said carrier and located directly above it, the walls of said hopper forming a continuation of said porous side walls whereby the hopper, carrier, belt, and side walls form an enclosed continuous passage, a feeding tank above said feeding hopper, a shaft centrally arranged in said tank, a spiral feed screw on the bottom of said shaft adapted to operate on the material just above said hopper, a helical feeding member adjacent the top of said tank, said member having a mesh body portion adapted to contact the material, agitating means connected to said shaft intermediate said helical feeding member and said feed screw, said agitating means including a substantially horizontal arm mounted on said shaft and fingers extending downwards from said arm adapted to engage the material and keep it in a loose condition.

3. A device for densifying dry powdery materials, comprising in combination, wide porous converging surfaces forming a wide throat between which the material is adapted to be gradually compressed, porous side walls adapted to confine the material between said converging surfaces, an enclosed tapered feed passage leading to said throat and forming an enclosed continuation thereof, a spiral feed screw adjacent the discharge end of said passage, a helical feeding member adjacent the entrance of said passage, said member having a mesh body portion adapted to contact the material, agitating means intermediate said helical feeding member and said feed screw for keeping the material in loose condition, and means for actuating said feed screw, helical feeding member and agitating means.

4. A device for densifying dry powdery material, comprising in combination, a substantially horizontal porous carrier adapted to receive the material and to convey it in a relatively thin layer to points at which it is gradually compressed by a converging porous belt, porous side walls for confining the material between said carrier and belt, and means for forming a relatively uniformly thin layer on said carrier, including a tapered hopper above the feed end of said carrier, said hopper having walls forming with the carrier, belt, and side walls an enclosed passage, a feed tank above said hopper, a rotatable shaft centrally arranged in said tank, a spiral feed screw on the bottom of said shaft adapted to feed the material to the carrier, a helical feeding member adjacent the top of said tank, said member having a perforated body portion adapted to engage the material, and agitating means intermediate said helical feeding member and said feed screw for keeping the finely divided material in loose condition.

5. A device, as claimed in claim 1, including means for controlling the thickness of the layer of material fed between said belts.

CHARLES KAUFMANN.
ARTHUR HOIJORD ANDERSEN.

REFERENCES CITED

The following references are of record in the file of this patent:

UNITED STATES PATENTS

| Number | Name | Date |
| --- | --- | --- |
| 1,801,487 | Cirignani | Apr. 21, 1931 |
| 1,908,807 | Ashley | May 16, 1933 |
| 1,915,733 | Hand | June 27, 1933 |
| 2,005,542 | Glaxner | June 18, 1935 |
| 2,057,312 | Richardson | Oct. 13, 1936 |
| 1,958,279 | Morgan | May 8, 1934 |
| 2,059,432 | Bentley | Nov. 3, 1936 |
| 1,153,103 | Neale | Sept. 7, 1915 |
| 2,349,080 | Deck | May 16, 1944 |

FOREIGN PATENTS

| Number | Country | Date |
| --- | --- | --- |
| 601,270 | French | Nov. 26, 1925 |
| 326,494 | British | Mar. 14, 1930 |